US009003107B2

(12) United States Patent
Chen

(10) Patent No.: US 9,003,107 B2
(45) Date of Patent: Apr. 7, 2015

(54) METHOD FOR ADJUSTING STORAGE SPACE OF PARTITION OF EMBEDDED MULTIMEDIA CARD AND TERMINAL

(71) Applicant: Huawei Device Co., Ltd., Shenzhen (CN)

(72) Inventor: Lei Chen, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/105,946

(22) Filed: Dec. 13, 2013

(65) Prior Publication Data

US 2014/0108710 A1 Apr. 17, 2014

Related U.S. Application Data

(63) Continuation of application No. PCT/CN2012/082968, filed on Oct. 15, 2012.

(51) Int. Cl.
*G06F 12/00* (2006.01)
*G06F 12/02* (2006.01)
*G06F 12/06* (2006.01)

(52) U.S. Cl.
CPC ...... *G06F 12/0246* (2013.01); *G06F 2212/171* (2013.01); *G06F 2212/7204* (2013.01); *G06F 12/0638* (2013.01)

(58) Field of Classification Search
CPC ............... G06F 3/0644; G06F 3/0679; G06F 2212/7204; G06F 2213/3804; G06F 3/0632; G06F 3/0608
USPC ........................................................ 711/103
See application file for complete search history.

(56) References Cited

U.S. PATENT DOCUMENTS

| 7,833,064 | B1 | 11/2010 | Lai | |
|---|---|---|---|---|
| 2007/0288717 | A1* | 12/2007 | Camiel | .......................... 711/170 |

(Continued)

FOREIGN PATENT DOCUMENTS

| CN | 1567362 | A | 1/2005 |
|---|---|---|---|
| CN | 102200948 | A | 9/2011 |
| CN | 102713941 | A | 10/2012 |
| EP | 2535846 | A1 | 12/2012 |

OTHER PUBLICATIONS

Lee et al., "Smart layers and dumb result: IO characterization of an android-based smartphone", 2012, EMSOFT '12 Proceedings of the tenth ACM international conference on Embedded software, pp. 23-32, New York, NY.*

(Continued)

*Primary Examiner* — Aimee Li
*Assistant Examiner* — Michael C Kolb
(74) *Attorney, Agent, or Firm* — Brinks Gilson & Lione

(57) ABSTRACT

A method is provided for adjusting a storage space of a partition of an embedded multimedia card and a terminal. The method includes: determining a current external SD card mode of a terminal, where the external SD card mode includes an external SD card installed mode or an external SD card uninstalled mode; receiving instruction information, where the instruction information is used for instructing the terminal to switch from the external SD card uninstalled mode to the external SD card installed mode, or used for instructing the terminal to switch from the external SD card installed mode to the external SD card uninstalled mode; and adjusting a size of a storage space of a partition of an embedded multimedia card according to the instruction information.

10 Claims, 5 Drawing Sheets

(56) References Cited

U.S. PATENT DOCUMENTS

2009/0282195 A1* 11/2009 Wang .............................. 711/115
2010/0131695 A1*  5/2010 Gyl et al. ....................... 711/103
2011/0252191 A1* 10/2011 Chang ........................... 711/105
2012/0198133 A1   8/2012 Chou et al.

OTHER PUBLICATIONS

Lim et al., "Applications IO profiling and analysis for smart devices", Journal of Systems Architecture: the EUROMICRO Journal, vol. 59 Issue 9, Oct. 2013, pp. 740-747.*

* cited by examiner

METHOD FOR ADJUSTING STORAGE SPACE OF PARTITION OF EMBEDDED MULTIMEDIA CARD AND TERMINAL

CROSS-REFERENCE TO RELATED APPLICATIONS

This application is a continuation of International Application No. PCT/CN2012/082968, filed on Oct. 15, 2012, which is hereby incorporated by reference in its entirety.

TECHNICAL FIELD

The present disclosure relates to the field of communication technologies, and in particular, to a method for adjusting a storage space of a partition of an embedded multimedia card and a terminal.

BACKGROUND

At present, EMMC (Embedded MultiMedia Cards, embedded multimedia card) chips are commonly used in smart phones as new storage media. EMMC chips are have a large storage space and low cost.

An EMMC storage chip generally has a large storage space, but system files and so on of a terminal often do not need to use such a large storage space. Therefore, in the EMMC storage chip, a region is obtained through dividing to serve as a simulative SD (Secure Digital Memory Card, secure digital memory card) card, which may usually be referred to as an internal SD card partition, for convenience of use by a user. The terminal may also support an external SD card.

The internal SD card partition and a data partition (system partition) may be set separately, which is not limited. In a case that the internal SD card partition and the data partition are set separately, it is required that sizes of storage spaces of the internal SD card and the data partition are determined through dividing before a mobile phone leaves the factory.

In a process of implementing an adjustment for a storage space of a partition of an embedded multimedia card described above, prior art devices have at least the following problems. The terminal has different requirements for the size of the storage space of the internal SD card partition and the size of the storage space of the data partition when using the external SD card and not using the external SD card, but the size of the storage space of the internal SD card partition and the size of the storage space of the data partition have been determined when the terminal leaves the factory; therefore, it is caused that the terminal has low flexibility in adjusting a storage space of each partition in different application scenarios, and cannot satisfy different requirements of the user.

SUMMARY

In an aspect, a method for adjusting a storage space of a partition of an embedded multimedia card includes:
  determining a current external SD card mode of a terminal, where the external SD card mode includes one of an external SD card installed mode or an external SD card uninstalled mode;
    receiving instruction information, where the instruction information is used for instructing the terminal to switch from the external SD card uninstalled mode to the external SD card installed mode, or used for instructing the terminal to switch from the external SD card installed mode to the external SD card uninstalled mode; and
    adjusting a size of a storage space of a partition of an embedded multimedia card according to the instruction information.

In another aspect, a terminal including an embedded multimedia card includes:
  a receiver, configured to receive instruction information, where the instruction information is used for instructing the terminal to switch from an external SD card uninstalled mode to an external SD card installed mode, or used for instructing the terminal to switch from an external SD card installed mode to an external SD card uninstalled mode; and
  a processor, configured to determine a current external SD card mode of the terminal, where the external SD card mode includes one of the external SD card installed mode or the external SD card uninstalled mode, and adjust a size of a storage space of a partition of the embedded multimedia card according to the instruction information received by the receiver.

BRIEF DESCRIPTION OF DRAWINGS

To describe the solutions in the embodiments of the present invention more clearly, the following briefly introduces accompanying drawings required for describing the embodiments. The accompanying drawings in the following description show merely some embodiments of the present invention, and persons of ordinary skill in the art may further obtain other drawings according to these accompanying drawings without creative efforts.

DESCRIPTION OF EMBODIMENTS

The following clearly describes the solutions in the embodiments of the present invention with reference to the accompanying drawings in the embodiments of the present invention. The embodiments to described are merely part rather than all of the embodiments of the present invention. All other embodiments obtained by persons of ordinary skill in the art based on the embodiments of the present invention without creative efforts shall fall within the protection scope of the present invention.

To describe the embodiments, a relationship between a system partition and an external SD card installed mode and a relationship between the system partition and an external SD card uninstalled mode are first described briefly.

In the external SD card uninstalled mode, a storage space of the system partition may be set to be smaller to leave an enough storage space for an internal SD card partition, so that a user may conveniently use the internal SD card partition as a USB flash disk to perform operations such as file copy. The large enough storage space of the internal SD card partition can also better ensure use of part of media applications. For example, in a camera application, more photo data and video data can be stored. The system partition may be used for, but is not limited to, storing system data.

In the external SD card installed mode, the storage space of the system partition may be set to be larger. Because an external SD card is used by the user, use scenarios of the internal SD card partition are greatly reduced. In this case, if a too large storage space is set for the internal SD card partition, a waste of storage space resources to a great extent may be caused, because the storage space of the internal SD card partition is basically useless in this case.

Figure 1:
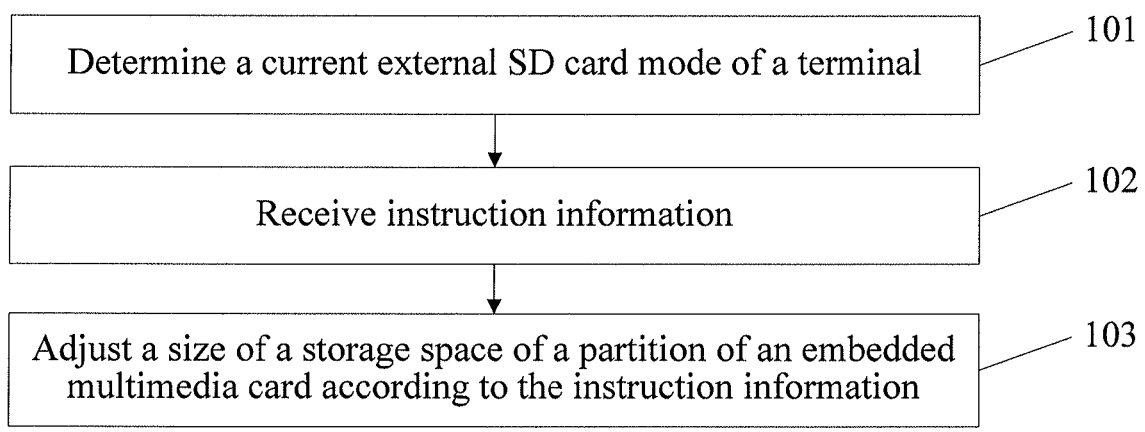
FIG. 1 is a flow chart of a method for adjusting a storage space of a partition of an embedded multimedia card according to an embodiment.

An embodiment provides a method for adjusting a storage space of a partition of an embedded multimedia card. An execution entity of the method may be a terminal. As shown in FIG. 1, the method may include:

101: Determine a current external SD card mode of a terminal, where the external SD card mode includes an external SD card installed mode and an external SD card uninstalled mode.

102: Receive instruction information, where the instruction information for switching the external SD card mode is used for instructing the terminal to switch from the external SD card uninstalled mode to the external SD card installed mode, or used for instructing the terminal to switch from the external SD card installed mode to the external SD card uninstalled mode.

103: Adjust a size of a storage space of a partition of an embedded multimedia card according to the instruction information.

By adopting the foregoing solution, the current external SD card mode of the terminal is determined, where the external SD card mode includes the external SD card installed mode or the external SD card uninstalled mode; the instruction information is received, where the instruction information is used for instructing the terminal to switch from the external SD card uninstalled mode to the external SD card installed mode, or used for instructing the terminal to switch from the external SD card installed mode to the external SD card uninstalled mode; and the size of the storage space of the partition of the embedded multimedia card is adjusted according to the instruction information. As a result, the terminal may adjust a storage space of each partition in different application scenarios, thereby increasing flexibility of a storage space of the terminal and better satisfying different requirements of a user.

Figure 2:
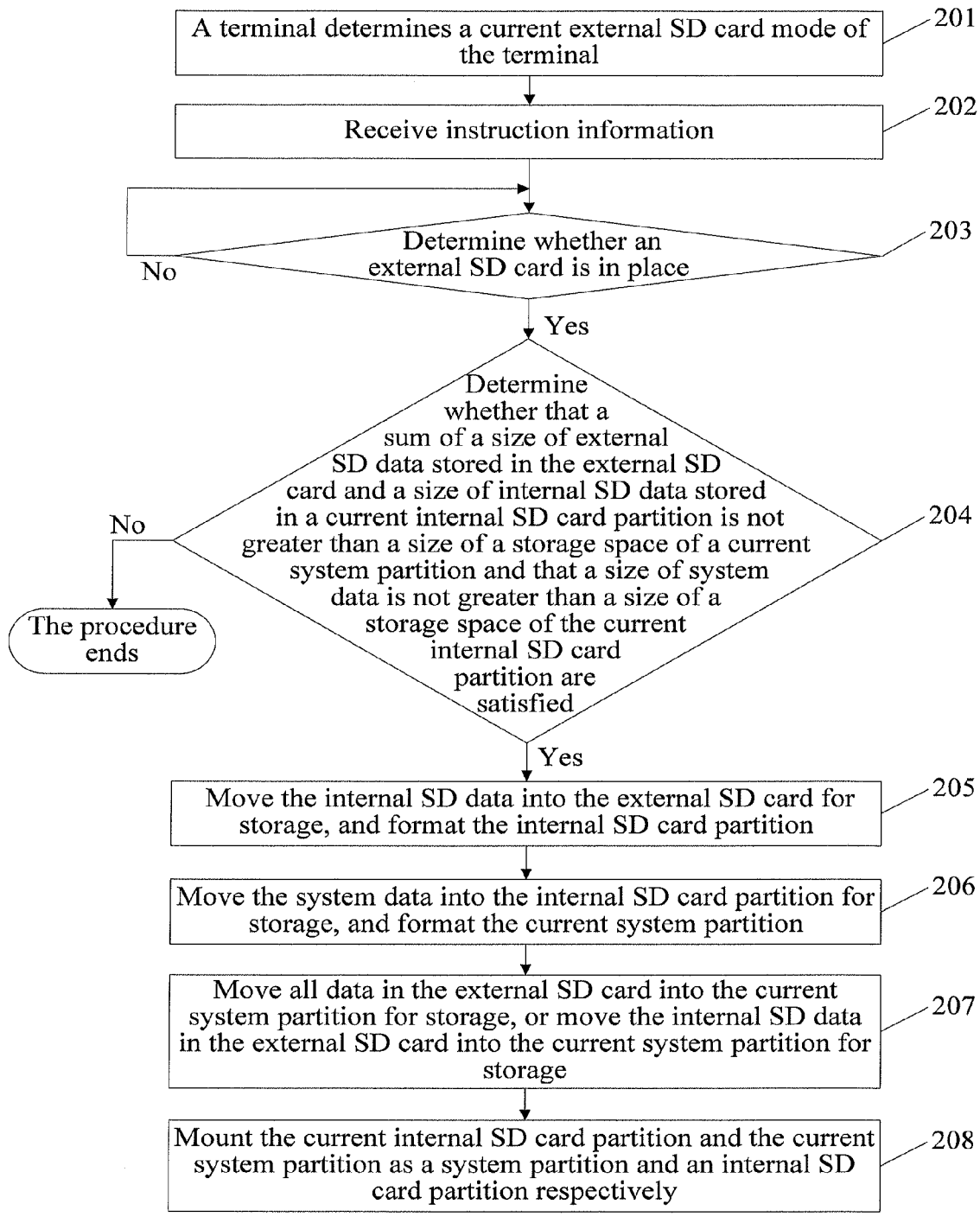
FIG. 2 is a flow chart of a method for adjusting a storage space of a partition of an embedded multimedia card where a terminal switches from an external SD card uninstalled mode to an external SD card installed model according to an embodiment.

An embodiment provides another method for adjusting a storage space of a partition of an embedded multimedia card. In the method, a terminal switches from an external SD card uninstalled mode to an external SD card installed mode. As shown in FIG. 2, the method may include:

201: A terminal determines a current external SD card mode of the terminal.

The external SD card mode may include, but is not limited to, an external SD card installed mode or an external SD card uninstalled mode. This embodiment is described by taking that the current external SD card mode is the external SD card uninstalled mode as an example.

202: Receive instruction information.

The instruction information may be used for, but is not limited to, instructing the terminal to switch from the external SD card uninstalled mode to the external SD card installed mode, or may also be used for, but is not limited to, instructing the terminal to switch from the external SD card installed mode to the external SD card uninstalled mode.

This embodiment is described by taking that the instruction information is used for instructing the terminal to switch from the external SD card uninstalled mode to the external SD card installed mode as an example.

Figure 3:
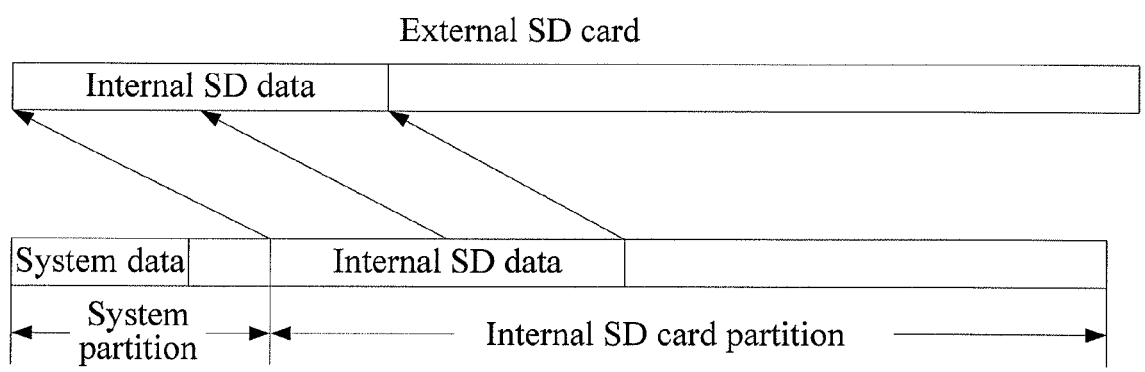
FIG. 3 is a schematic structural diagram of a system partition and an internal SD card partition according to an embodiment.

Generally, a partition of an embedded multimedia card may include, but is not limited to, a system partition and an internal SD card partition. As shown in FIG. 3, it is a schematic structural diagram of a system partition and an internal SD card partition.

As an implementation manner of this embodiment, a too large storage space of the internal SD card partition is not required when the terminal is equipped with an external SD card. Therefore, when the terminal switches from the external SD card uninstalled mode to the external SD card installed mode, a storage space of a current internal SD card partition may be reduced and a storage space of a current system partition may be increased.

Generally, if a current mode is the external SD card uninstalled mode, a storage space of the system partition is smaller than a storage space of the internal SD card partition. Therefore, the terminal may interchange the internal SD card partition with the system partition, so as to implement increasing of the storage space of the system partition and reducing of the storage space of the internal SD card partition at the same time.

The terminal provided by this embodiment may be, but is not limited to, a mobile phone and an electronic device in which an external SD card may be disposed.

Further optionally, an operation of implementing increasing of the storage space of the system partition and reducing of the storage space of the internal SD card partition at the same time may be executed in a case that data in the system partition or data in the internal SD card partition is not used.

Specifically, steps 203 to 208 are specific execution methods in which the terminal reduces the storage space of the current internal SD card partition and increase the storage space of the current system partition according to the instruction information.

203: Determine whether an external SD card is in place, if yes, execute step 204; if no, notify a user of inserting an external SD card, and execute step 204 after the external SD card is in place.

204: Determine whether that a sum of a size of external SD data stored in the external SD card and a size of internal SD data stored in the current internal SD card partition is not greater than a size of the storage space of the current system partition and that a size of system data is not greater than a size of the storage space of the current internal SD card partition are satisfied; if yes, execute step 205; if no, the procedure ends.

As an implementation manner of this embodiment, if the sum of the size of the external SD data stored in the external SD card and the size of the internal SD data stored in the current internal SD card partition is greater than the size of the storage space of the current system partition, the terminal may, but is not limited to, inquire whether the user deletes the internal SD data and/or the external SD data, and then execute subsequent steps until the sum of the external SD data and the internal SD data is less than the size of the storage space of the current system partition.

205: Move the internal SD data into the external SD card for storage, and format the internal SD card partition.

206: Move the system data into the internal SD card partition for storage, and format the current system partition.

207: Move all data in the external SD card into the current system partition for storage, or move the internal SD data in the external SD card into the current system partition for storage.

208: Mount the current internal SD card partition and the current system partition as a system partition and an internal SD card partition respectively.

Figure 4:
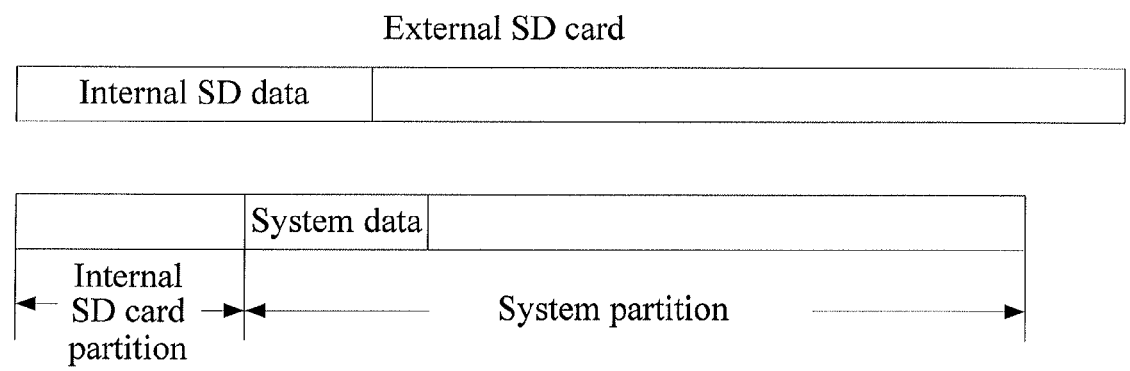
FIG. 4 is a schematic structural diagram of an internal SD card partition and a system partition after being mounted as a system partition and an internal SD card partition respectively according to an embodiment.

As shown in FIG. 4, it is a schematic structural diagram of an internal SD card partition and a system partition after being mounted as a system partition and an internal SD card partition respectively.

The mounting provided by this embodiment may usually refer to allocating a label to a disk partition (including a virtual disk partition), namely, in this embodiment, modifying the current internal SD card partition into the system partition and modifying the current system partition into the internal SD card partition.

In this way, in a case of ensuring that no raw data is lost, the current system partition and the current internal SD card partition are interchanged with each other, thereby increasing the storage space of the system partition and reducing the storage space of the internal SD card partition at the same time.

Further optionally, if the size of the system data is greater than the size of the storage space of the current internal SD card partition, step 204 may be as follows.

The terminal may, but is not limited to, move data which is in the system data and cannot be moved into the external SD card for storage into the internal SD card partition for storage, and move data which is in the system data and can be moved into the external SD card for storage into the external SD card for storage.

If the data which is in the system data and cannot be moved into the external SD card for storage is still greater than the size of the storage space of the current internal SD card partition, the user may, but is not limited to, be notified of deleting part of applications, and the subsequent steps are executed until the data which is in the system data and cannot be moved into the external SD card for storage is less than the size of the storage space of the current internal SD card partition.

In this case, if step 207 is moving the internal SD data in the external SD card into the current system partition for storage, after step 208 is executed, the method may further include: backing up the system data moved into the external SD card or moving the system data moved into the external SD card into the internal SD card partition.

By adopting the foregoing solution, the current external SD card mode of the terminal is determined, where the external SD card mode includes the external SD card installed mode or the external SD card uninstalled mode; the instruction information is received, where the instruction information is used for instructing the terminal to switch from the external SD card uninstalled mode to the external SD card installed mode, or used for instructing the terminal to switch from the external SD card installed mode to the external SD card uninstalled mode; and the size of the storage space of the partition of the embedded multimedia card is adjusted according to the instruction information. As a result, the terminal may adjust a storage space of each partition in different application scenarios, thereby increasing flexibility of a storage space of the terminal and better satisfying different requirements of the user.

Figure 5:
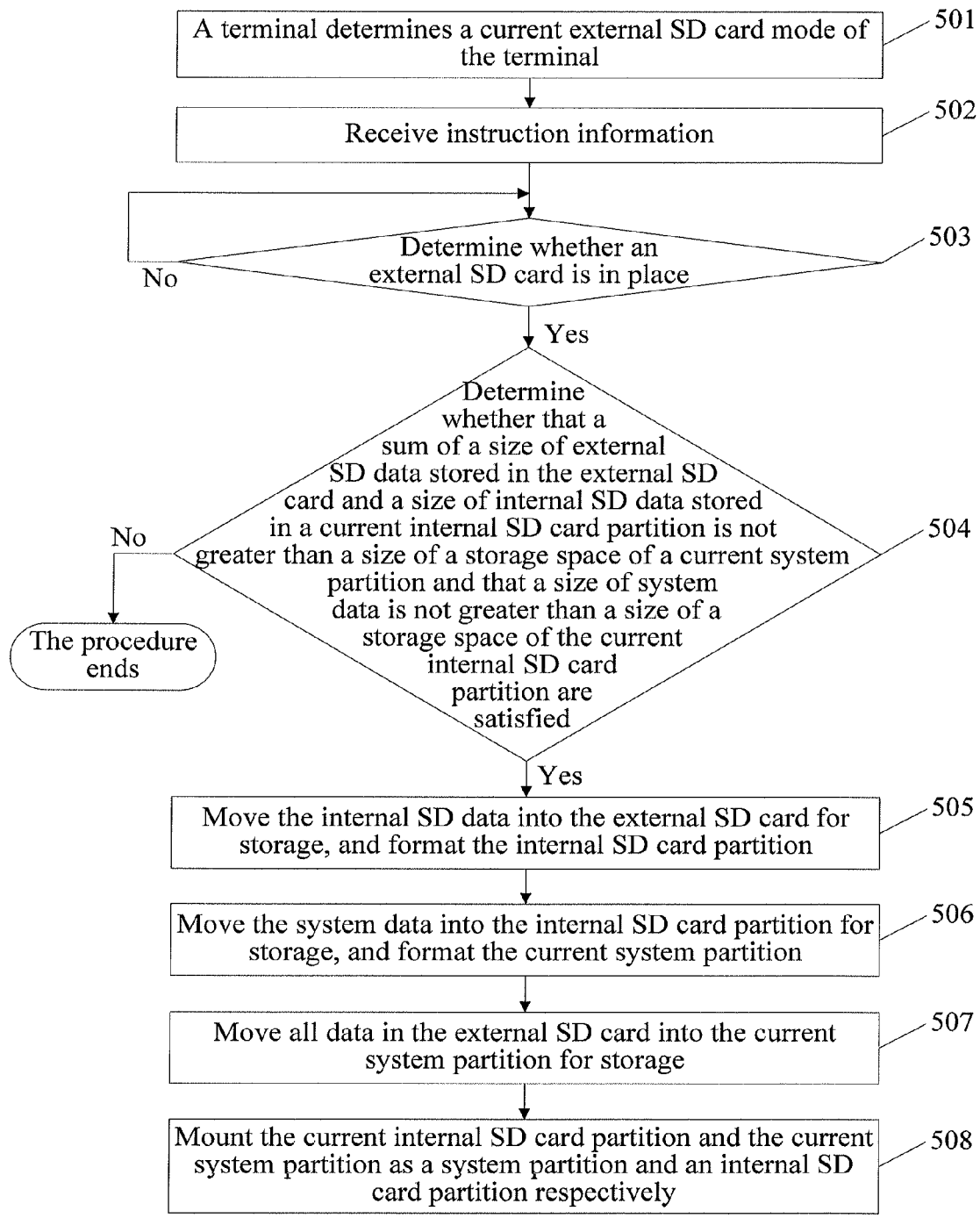
FIG. 5 is a flow chart of a method for adjusting a storage space of a partition of an embedded multimedia card where a terminal switches from an external SD card installed mode to an external SD card uninstalled model according to an embodiment.

An embodiment provides another method for adjusting a storage space of a partition of an embedded multimedia card. In the method, a terminal switches from an external SD card installed mode to an external SD card uninstalled mode. As shown in FIG. 5, the method may include:

501: A terminal determines a current external SD card mode of the terminal.

This embodiment is described by taking that the current external SD card mode is an external SD card installed mode as an example.

502. Receive instruction information.

The instruction information may be used for, but is not limited to, instructing the terminal to switch from the external SD card uninstalled mode to the external SD card installed mode, or may also be used for, but is not limited to, instructing the terminal to switch from the external SD card installed mode to the external SD card uninstalled mode.

This embodiment is described by taking that the instruction information is used for instructing the terminal to switch from the external SD card installed mode to the external SD card uninstalled mode as an example.

As an implementation manner of this embodiment, a large storage space of an internal SD card partition may be required when the terminal is not equipped with an external SD card. Therefore, when the terminal switches from the external SD card installed mode to the external SD card uninstalled mode, a storage space of a current internal SD card partition may be increased and a storage space of a current system partition may be reduced.

Generally, if the current mode is the external SD card installed mode, the storage space of the internal SD card partition is smaller than a storage space of a system partition. Therefore, the terminal may interchange the internal SD card partition with the system partition, so as to implement increasing of the storage space of the internal SD card partition and reducing of the storage space of the system partition at the same time.

Specifically, steps 503 to 508 are specific execution methods in which the storage space of the current internal SD card partition is increased and the storage space of the current system partition is reduced according to the instruction information.

503: Determine whether an external SD card is in place, if yes, execute step 504; if no, notify a user of inserting an external SD card, and execute step 504 after the external SD card is in place.

504: Determine whether that a sum of a size of external SD data stored in the external SD card and a size of internal SD data stored in the current internal SD card partition is not greater than a size of the storage space of the current system partition and that a size of system data is not greater than a size of the storage space of the current internal SD card partition are satisfied; if yes, execute step 505; if no, the procedure ends.

As an implementation manner of this embodiment, if the sum of the size of the external SD data stored in the external SD card and the size of the internal SD data stored in the current internal SD card partition is greater than the size of the storage space of the current system partition, the terminal may, but is not limited to, inquire whether the user deletes the internal SD data and/or the external SD data, and then execute subsequent steps until the sum of the external SD data and the internal SD data is less than the size of the storage space of the current system partition.

Steps executed in case of different determining results are not limited in this embodiment, may be set according to actual needs, and are not described in detail here.

505: Move the internal SD data into the external SD card for storage, and format the internal SD card partition.

506: Move the system data into the internal SD card partition for storage, and format the current system partition.

Further optionally, if the size of the system data is greater than the size of the storage space of the current internal SD card partition, the terminal may, but is not limited to, move data which is in the system data and cannot be moved into the external SD card for storage into the internal SD card partition for storage, and move data which is in the system data and can be moved into the external SD card for storage into the external SD card for storage.

507: Move all data in the external SD card into the current system partition for storage.

508: Mount the current internal SD card partition and the current system partition as a system partition and an internal SD card partition respectively.

By adopting the foregoing solution, the current external SD card mode of the terminal is determined, where the external SD card mode includes the external SD card installed mode or the external SD card uninstalled mode; the instruction information is received, where the instruction information is used for instructing the terminal to switch from the external SD card uninstalled mode to the external SD card installed mode, or used for instructing the terminal to switch from the external SD card installed mode to the external SD card uninstalled mode; and the size of the storage space of the partition of the embedded multimedia card is adjusted according to the instruction information. As a result, the terminal may adjust a storage space of each partition in different application scenarios, thereby increasing flexibility of a storage space of the terminal and better satisfying different requirements of the user.

Figure 6:
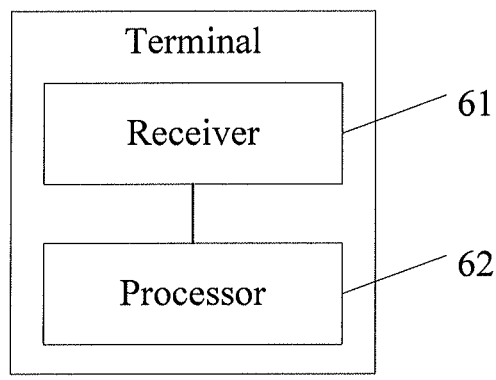
FIG. 6 is a schematic structural diagram of a terminal including an embedded multimedia card according to an embodiment.

An embodiment provides a terminal including an embedded multimedia card. As shown in FIG. 6, the terminal may include:
- a receiver 61, configured to receive instruction information, where the instruction information is used for instructing the terminal to switch from an external SD card uninstalled mode to an external SD card installed mode, or used for instructing the terminal to switch from an external SD card installed mode to an external SD card uninstalled mode; and
- a processor 62, configured to determine a current external SD card mode of the terminal, where the external SD card mode includes the external SD card installed mode or the external SD card uninstalled mode, and adjust a size of a storage space of a partition of the embedded multimedia card according to the instruction information received by the receiver.

Further, the processor 62 is further configured to, if the instruction information is used for instructing the terminal to switch from the external SD card uninstalled mode to the external SD card installed mode, reduce a storage space of a current internal SD card partition and increase a storage space of a current system partition according to the instruction information; and if the instruction information is used for instructing the terminal to switch from the external SD card installed mode to the external SD card uninstalled mode, increase the storage space of the current internal SD card partition and reduce the storage space of the current system partition according to the instruction information.

Further, the processor 62 is further configured to: determine whether that a sum of a size of external SD data stored in an external SD card and a size of internal SD data stored in the current internal SD card partition is not greater than a size of the storage space of the current system partition and that a size of system data is not greater than a size of the storage space of the current internal SD card partition are satisfied; if yes, move the internal SD data into the external SD card for storage, and format the internal SD card partition; move the system data into the internal SD card partition for storage, and format the current system partition; and mount the current internal SD card partition and the current system partition as a system partition and an internal SD card partition respectively, Herein, if the instruction information is used for instructing the terminal to switch from the external SD card uninstalled mode to the external SD card installed mode, the storage space of the current internal SD card partition is larger than the storage space of the current system partition; and if the instruction information is used for instructing the terminal to switch from the external SD card installed mode to the external SD card uninstalled mode, the storage space of the current system partition is larger than the storage space of the current internal SD card partition.

Further, the processor 62 is further configured to, if the size of the system data is greater than the size of the storage space of the current internal SD card partition, move data which is in the system data and cannot be moved into the external SD card for storage into the internal SD card partition for storage, and move data which is in the system data and can be moved into the external SD card for storage into the external SD card for storage.

Further, the processor 62 is further configured to, if the instruction information is used for instructing the terminal to switch from the external SD card installed mode to the external SD card uninstalled mode, move all data in the external SD card into the current system partition for storage.

Further, the processor 62 is further configured to, if the instruction information is used for instructing the terminal to switch from the external SD card uninstalled mode to the external SD card installed mode, move all data in the external SD card into the current system partition for storage, or move the internal SD data in the external SD card into the current system partition for storage.

By adopting the foregoing solution, the receiver receives the instruction information, where the instruction information is used for instructing the terminal to switch from the external SD card uninstalled mode to the external SD card installed mode, or used for instructing the terminal to switch from the external SD card installed mode to the external SD card uninstalled mode; the processor determines the current external SD card mode of the terminal, where the external SD card mode includes the external SD card installed mode or the external SD card uninstalled mode; and the processor adjusts the size of the storage space of the partition of the embedded multimedia card according to the instruction information received by the receiver. As a result, the terminal may adjust a storage space of each partition in different application scenarios, thereby increasing flexibility of a storage space of the terminal and better satisfying different requirements of a user.

Through the foregoing description of the implementation manners, persons skilled in the art may clearly understand that the present invention may be implemented by software plus necessary universal hardware, and definitely may also be implemented by hardware, but in many cases, the former is a preferred implementation manner. Based on such understanding, the technical solutions of the present invention essentially, or the part contributing to the prior art may be embodied in a form of a software product. The computer software product is stored in a readable storage medium, for example, a floppy disk, a hard disk, or an optical disk of a computer, and includes several instructions for enabling a computer device (which may be a personal computer, a server, or a network device, or the like) to perform the methods described in the embodiments of the present invention.

The foregoing description is merely specific implementation manners of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for adjusting a storage space of a partition of an embedded multimedia card, comprising:

determining a current external SD card mode of a terminal, wherein the external SD card mode comprises one of an external SD card installed mode or an external SD card uninstalled mode; wherein the terminal does not have an external SD card installed when the terminal is in the external SD card uninstalled mode, the terminal has the external SD card installed when the terminal is in the external SD card installed mode, and the embedded multimedia card is distinct from the external SD card and comprises an internal SD card partition and a system partition;

receiving instruction information, wherein the instruction information is used for instructing the terminal to switch from the external SD card uninstalled mode to the external SD card installed mode, or used for instructing the terminal to switch from the external SD card installed mode to the external SD card uninstalled mode;

when the instruction information is used to instruct the terminal to switch from the external SD card uninstalled mode to the external SD card installed mode, reducing a storage space of the internal SD card partition and increasing a storage space of the system partition according to the instruction information; and when the instruction information is used to instruct the terminal to switch from the external SD card installed mode to the external SD card uninstalled mode, increasing the storage space of the internal SD card partition and reducing the storage space of the system partition according to the instruction information.

2. The method according to claim 1, wherein the reducing the storage space of the internal SD card partition and increasing the storage space of the system partition according to the instruction information, or the increasing the storage space of the internal SD card partition and reducing the storage space of the system partition according to the instruction information comprises:

determining whether a sum of a size of external SD data stored in an external SD card and a size of internal SD data stored in the current internal SD card partition is not greater than a size of the storage space of the current system partition and whether a size of system data is not greater than a size of the storage space of the current internal SD card partition;

if the sum of a size of external SD data stored in an external SD card and a size of internal SD data stored in the current internal SD card partition is not greater than a size of the storage space of the current system partition and the size of system data is not greater than a size of the storage space of the current internal SD card partition, moving the internal SD data into the external SD card for storage, and formatting the internal SD card partition;

moving the system data into the internal SD card partition for storage, and formatting the current system partition; and mounting the current internal SD card partition and the current system partition as a system partition and an internal SD card partition respectively, wherein if the instruction information is used for instructing the terminal to switch from the external SD card uninstalled mode to the external SD card installed mode, the storage space of the current internal SD card partition is larger than the storage space of the current system partition; and if the instruction information is used for instructing the terminal to switch from the external SD card installed mode to the external SD card uninstalled mode, the storage space of the current system partition is larger than the storage space of the current internal SD card partition.

3. The method according to claim 2, wherein the moving the system data into the internal SD card partition for storage if the size of the system data is greater than the size of the storage space of the current internal SD card partition comprises:

moving data which is in the system data and cannot be moved into the external SD card for storage into the internal SD card partition for storage, and moving data which is in the system data and can be moved into the external SD card for storage into the external SD card for storage.

4. The method according to claim 3, wherein before the mounting the internal SD card partition and the system partition as the system partition and the internal SD card partition respectively if the instruction information is used for instructing the terminal to switch from the external SD card installed model to the external SD card uninstalled mode, the method further comprises:

moving all data in the external SD card into the current system partition for storage.

5. The method according to claim 3, wherein before the mounting the internal SD card partition and the system partition as the system partition and the internal SD card partition respectively if the instruction information is used for instructing the terminal to switch from the external SD card uninstalled model to the external SD card installed mode, the method further comprises:

moving all data in the external SD card into the current system partition for storage; or moving the internal SD data in the external SD card into the current system partition for storage.

6. A terminal comprising an embedded multimedia card, comprising:

a receiver, configured to receive instruction information, wherein the instruction information is used for instructing the terminal to switch from an external SD card uninstalled mode to an external SD card installed mode, or used for instructing the terminal to switch from an external SD card installed mode to an external SD card uninstalled mode; wherein the terminal does not have an external SD card installed when the terminal is in the external SD card uninstalled mode, the terminal has the external SD card installed when the terminal is in the external SD card installed mode, and the embedded multimedia card is distinct from the external SD card and comprises an internal SD card partition and a system partition; and a processor, configured to determine a current external SD card mode of the terminal, reduce a storage space of the internal SD card partition and increase a storage space of the system partition according to the instruction information when the instruction information is used to instruct the terminal to switch from the external SD card uninstalled mode to the external SD card installed mode, and increase the storage space of the internal SD card partition and reduce the storage space of the system partition according to the instruction information; wherein the external SD card mode comprises one of the external SD card installed mode and the external SD card uninstalled mode.

7. The terminal according to claim 6, wherein the processor is further configured to: determine whether a sum of a size of external SD data stored in an external SD card and a size of internal SD data stored in the current internal SD card partition is not greater than a size of the storage space of the current system partition and whether a size of system data is not greater than a size of the storage space of the current internal SD card partition; if the sum of a size of external SD data stored in an external SD card and a size of internal SD data stored in the current internal SD card partition is not greater than a size of the storage space of the current system partition and the size of system data is not greater than a size of the storage space of the current internal SD card partition, move the internal SD data into the external SD card for storage, and format the internal SD card partition; move the system data into the internal SD card partition for storage, and format the current system partition; and mount the current internal SD card partition and the current system partition as a system partition and an internal SD card partition respectively, wherein if the instruction information is used for instructing the terminal to switch from the external SD card uninstalled mode to the external SD card installed mode, the storage space of the current internal SD card partition is larger than the storage space of the current system partition; and if the instruction information is used for instructing the terminal to switch from the external SD card installed mode to the external SD card uninstalled mode, the storage space of the current system partition is larger than the storage space of the current internal SD card partition.

8. The terminal according to claim 7, wherein the processor is further configured to, if the size of the system data is greater than the size of the storage space of the current internal SD card partition, move data which is in the system data and cannot be moved into the external SD card for storage into the internal SD card partition for storage, and move data which is in the system data and can be moved into the external SD card for storage into the external SD card for storage.

9. The terminal according to claim 8, wherein the processor is further configured to, if the instruction information is used for instructing the terminal to switch from the external SD card installed mode to the external SD card uninstalled mode, move all data in the external SD card into the current system partition for storage.

10. The terminal according to claim 8, wherein the processor is further configured to, if the instruction information is used for instructing the terminal to switch from the external SD card uninstalled mode to the external SD card installed mode, move all data in the external SD card into the current system partition for storage, or move the internal SD data in the external SD card into the current system partition for storage.

* * * * *